United States Patent [19]

Chapman

[11] 4,166,840
[45] Sep. 4, 1979

[54] PROCESS FOR PRODUCING AMMONIUM PHOSPHATE FROM AMMONIA AND WET PROCESS PHOSPHORIC ACID

[75] Inventor: John D. Chapman, Felixstowe, England

[73] Assignee: Fisons Limited, London, England

[21] Appl. No.: 746,148

[22] Filed: Nov. 30, 1976

[30] Foreign Application Priority Data

Dec. 24, 1975 [GB] United Kingdom ............... 52765/75
Oct. 16, 1976 [GB] United Kingdom ............... 43053/76

[51] Int. Cl.$^2$ ....................... C01B 15/16; C01B 25/26
[52] U.S. Cl. ..................... 423/313; 423/310; 71/43
[58] Field of Search ............... 423/309, 310, 312, 313; 23/284; 71/43

[56] References Cited

U.S. PATENT DOCUMENTS

| 2,902,342 | 9/1959 | Kerley ................................. 71/43 X |
| 3,419,378 | 12/1968 | Kearns ................................. 423/313 |
| 3,647,369 | 3/1972 | Riehm et al. ......................... 423/313 |
| 3,758,277 | 9/1973 | Cook et al. ........................... 23/284 |

FOREIGN PATENT DOCUMENTS 557623  5/1958  Canada ..................................... 423/313

Primary Examiner—O. R. Vertiz
Assistant Examiner—G. A. Heller
Attorney, Agent, or Firm—Wenderoth, Lind & Ponack

[57] ABSTRACT

The present invention relates to a process for reacting ammonia and wet process phosphoric acid to produce ammonium phosphates, which process comprises feeding the reagents to a vessel comprising two tubular members in fluid flow communication with one another and with a gas disengagement vessel, at least one of said tubular members being generally upright, the ammonia being fed to the basal portion of the upright member, the phosphoric acid being fed to the other tubular member; allowing the resultant reaction mixture to circulate spontaneously up the upright member, through the gas disengagement vessel and through the other member to the upright member; and recovering the ammonium phosphate reaction products from the reaction system.

12 Claims, 1 Drawing Figure

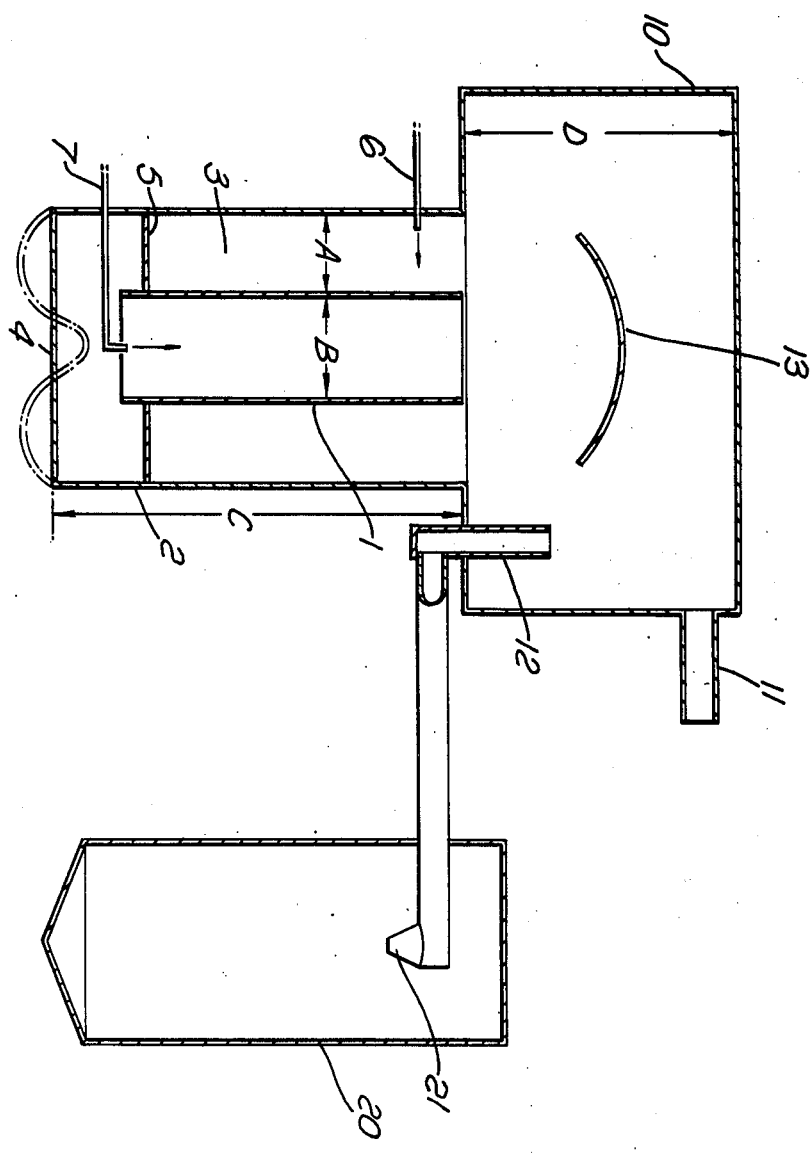

PROCESS FOR PRODUCING AMMONIUM PHOSPHATE FROM AMMONIA AND WET PROCESS PHOSPHORIC ACID

The present invention relates to a process and to a vessel for use therein.

When reacting an acid with an alkali, various forms of reaction vessels may be used. Thus, one may use a stirred reactor. However, such a reactor is comparatively expensive to install and operate. Alternatively, one could use a simple tube reactor. Whilst this latter is simple and cheap, it suffers from the major disadvantage that it is susceptible to scaling where impurities are liable to precipitate.

We have now devised a form of reaction system which reduces the problem of scaling associated with a simple tubular reactor and yet retains the merits of simplicity of a tubular reactor.

Accordingly, the present invention provides a process for carrying out a reaction between two chemical reagents which reaction involves a gaseous or vapour phase either as a reagent and/or as a product, which process comprises feeding the reagents to a vessel comprising two tubular members in fluid flow communication with one another and with a gas disengagement vessel, at least one of said tubular members being generally upright, one of the reagents being fed to the basal portion of the upright member, the other reagent being fed to the other tubular member; allowing the resultant reaction mixture to circulate spontaneously up the upright member, through the gas disengagement vessel and through the other member to the upright member; and recovering the reaction product from the reaction system.

From another aspect the invention also provides a vessel for use in the method of the invention which comprises two elongated tubular members in fluid flow communication with one another and with a void vessel, at least one of the tubular members being generally upright, whereby there is formed a circulation loop comprising the upright member, the void vessel and the other members; the upright member being provided with means for feeding a reagent to the basal portion thereof; the other member being provided with means for feeding a reagent thereto.

The term 'tubular' is used herein to denote an elongated hollow member which may have any suitable cross-section. Thus, the members may be circular or squared in cross-section or may be formed by a partition within a conventional tube, in which case the thus formed compartments provide the two tubular members.

The term 'upright' is used herein to denote that the tubular member is inclined at less than 20° to the vertical. Preferably, the tubular member is inclined at less than 5° to the vertical.

In the process of the invention the injection of the reagent into the basal portion of the upright member either introduces a gas into the reaction mixture and/or causes the evolution of a gas, a vapour and/or heat from the reaction mixture by reaction with the reagent which has been injected into the other upstream tubular member. The gas, vapour and/or heat cause the reaction mixture to rise up the upright tube, causing the reaction mixture as a whole to circulate though the two tubular members and the void, gas disengagement vessel. Suprisingly we have found that the rate of circulation achieved spontaneously by this means is sufficient to cause adequate mixing and reaction of the reagents and to inhibit the formation of scale or other deposits upon the reaction vessel surfaces. Thus, it is possible by appropriate sizing of the various components of the reaction vessel to achieve linear flow rates for the reaction mixture in excess of 0.1 meters per second throughout the reaction vessel. Furthermore, by providing the gas disengagement vessel or zone, it is possible to release vapours or gases generated from the reaction mixture at a controlled rate before the reaction mixture is recirculated or discharded as product. This is particularly useful as a means for regulating the pressure at which the reaction vessel is operated. Moreover, we have found that high efficiencies of ammonia utilisation may be achieved using the vessel of the invention in the ammoniation of acids, even when the linear flow rate of the reaction mixture through the upright member of the vessel is high, e.g. higher than 1.5 meters per second. This is in complete contrast to what would have been expected, since a high linear flow rate results in a short contact time between the feed ammonia and the reaction mixture and reduction of the contact time would have been expected to result in an increase in ammonia losses from the reaction mixture. Furthermore, where the ratio of the rate of circulation of the reaction mixture to the feed of reagents (both on a weight per unit time basis) is reduced, e.g. to less than 10:1 we have surprisingly found that the losses of ammonia from the system may be increased. Again this is contrary to what would have been expected and we have found as a generality that it is desirable to operate with as high a linear flow rate up to upright member as can be achieved, e.g. at least 2 meters per second.

The reaction vessel for present use may comprise a U tube reactor with a reagent inlet at the top portion, e.g. within the top ⅓rd of the length, of one arm and another reagent inlet at the bottom portion, e.g. within the bottom ⅓rd of the length, of the upright arm; the open ends of the U tube debouching into a header tank. Alternatively, the U tube could be in the form of a single upright tube debouching into a header tank and having its other end closed, e.g. by a flat or dished plate. The interior of the tube is subdivided into two compartments, which need not be of equal size, by an upright partition wall (which may be flat or curved) which does not extend to the base of the tube so that material may pass under the partition wall from one compartment to the other. In a yet further, and preferred embodiment, the reaction vessel comprises two tubular members, a shorter one mounted generally co-axially within a longer one having one end closed. Both tubes debouch into a gas disengagement zone or vessel. This may take the form of a void vessel of larger cross-sectional area than the inner tube or may be provided by extending the outer tube beyond the inner tube, so as to provide the requisite surface area to reduce the velocity at which the gases or vapours escape from the reaction mixture and thus permit the gas and/or vapour to disengage from the reaction mixture without causing excessive foaming and without carrying excessive amounts of reaction mixture with them. It is preferred that the gas escape velocity be reduced to an overall value of less than 5, preferably less than 1, meters/second.

A particularly preferred reaction vessel for present use comprises an elongated tubular member having one end closed and having mounted upon the other, open end, a vessel of larger cross-section than the elongated tubular member, there being mounted within said elongated tubular member an inner open ended tubular member, the inner member not extending to the closed end of the outer elongated tubular member, whereby there is provided an annular space between the inner and outer tubular members; there being provided adjacent to said open end of the outer tubular member a reagent inlet into the annular space between the two tubular members or into the inner member for one reagent, and a reagent inlet adjacent to the closed end of the outer member whereby the second reagent may be injected into the inner member or into the annular space respectively, and a vapour outlet and a product outlet.

The invention also provides a process for carrying out a reaction between two chemical reagents which reaction involves a gaseous or vapour phase either as a reagent or as a product, which process comprises feeding the reagents to a vessel comprising an elongated tubular member having one end closed and having mounted upon the other, open end, a vessel of larger cross-section than the elongated tubular member, there being mounted within said elongated tubular member an inner open ended tubular member, the inner member not extending to the closed end of the outer elongated tubular member, whereby there is provided an annular space between the inner and outer tubular members; one reagent being injected adjacent to said open end of the outer tubular member into the annular space between the two tubular members or into the inner member, the other reagent being injected adjacent to the closed end of the outer member into the inner member or into the annular space respectively, and a vapour outlet and a product outlet; and allowing the reaction mixture to circulate through the inner tubular member, the larger cross-section vessel and the annular space between the tubular members; and recovering product from the larger cross-section vessel and/or the outer tubular member.

In the above forms of reaction vessel when a gaseous or readily vapourised reagent (e.g. ammonia in gaseous or liquid form) is used, this reagent be fed to the upright member so as to cause circulation of the reaction mixture and it is preferred that the other reagent be fed tangentially into the other member so as to aid mixing of the feed material with the circulating reaction mixture.

For convenience, the process of the invention and the reaction vessel for use therein will be described with respect to this preferred form of reaction system in which the inner tube corresponds to the 'upright member' and the annular space corresponds to the 'other member' referred to above.

The term annular space is used herein to denote the gap between the inner wall of the outer member and the outer wall of the inner member. This need not be truly annular since the members need not be of circular cross-section and need not have their axes coincident. Moreover, the annular gap need not be of uniform width along its length (i.e. from top to bottom of the vessel).

To aid understanding of the invention a preferred form of the reaction vessel and its use will now be described by way of example with respect to the accompanying drawing which is a diagrammatic cross-section of the reaction vessel.

The reaction vessel comprises a substantially vertical inner tubular member 1 having both ends open and a substantially vertical outer tubular member 2.

Preferably, the members 1 and 2 have their axes substantially co-incident so as to leave an annular space 3 between them. The lower end of member 2 extends beyond the lower end of member 1 and is closed by an end wall 4. The end wall may be flat as shown, or may be dished or toroidal (as shown dotted) to assist circulation of the reaction mixture. The inner member 1 may be mounted within member 2 by means of ribs if desired.

The upper ends of members 1 and 2 debouch into vessel 10 which is of a larger cross-section than member 2. Typically, vessel 10 has a cross-sectional area 10 to 100 times that of the outer tube so that the velocity at which the gas escapes from the reaction mixture is reduced to a level at which foaming of the reaction mixture is reduced to an acceptable level and at which little or no droplets of the reaction mixture are carried out of the reaction system by the gases or vapours as they are vented to waste. Typically, the gas escape velocity is reduced to less than 0.5 meters per second, e.g. 0.2 to 0.005 meters per second. Vessel 10 also acts as a header tank for the reactor as well as a gas and/or vapour disengagement vessel. It is provided with a gas/vapour outlet 11 and a product outlet 12, both of which may have pressure release valves (not shown) so that the reactor may be operated under sub- or super-atmospheric pressure. If desired, product may be removed from the top of member 2. It may also be desired to provide an umbrella-like member 13 above the outlets of tubes 1 and 2 so as to restrain the spout of reaction mixture issuing from tube 1 where the linear flow rate in that tube is high.

The wall of member 2 is provided with a reagent inlet 6 whereby reagent is fed into the annular space 3. The inlet may comprise a number of inlets spaced around the circumference of member 2; may comprise a feed to an annular sparger located coaxially within the annular space 3; or may comprise one or more tangential inlets. The inlet(s) 6 are provided in the top ⅓ of the length of the annular space, desirably closely adjacent to the top of the gap to ensure mixing of the feed material and the recycling reaction mixture before the mixture reaches member 1. The base of the reactor is provided with an inlet 7 (either through the base of member 2 or through end wall 4) whereby a second reagent can be injected axially into tubular member 1. This inlet conveniently takes the form of an upwardly directed nozzle or ring of nozzles and it is preferably located substantially co-axially within member 1.

The reaction vessel is constructed from any suitable material, e.g. a plastics, a plastics coated metal, a rubber coated metal, stainless steel and the like, and is desirably a pressure reaction vessel.

In operation, one reagent is fed through inlet 6 until the reactor is full to the desired level. The second, usually gaseous, reagent is then injected through inlet 7. This causes circulation of the reaction mixture through space 3 and tubular member 1. Where the second reagent is injected axially up member 1 as described above, the circulation will be up member 1 through vessel 10 and down space 3. Where the second reagent is fed into the bottom of space 3, and the first reagent is fed into the top of member 1, the flow is in the reverse sense. Where the reaction releases heat as well as gas or vapour, this will further assist circulation. After the stoichiometrically required amount of the second reagent has been added, feed of the first reagent may begin again at the rate required to form the desired product which is withdrawn from vessel 10 via outlet 12. This outlet may be provided with a wier or other means for maintaining a minimum level of reaction mixture in the vessel 10 below which product is not removed from the system. Thus outlet 12 could take the form of a standpipe. The reaction mixture circulates through member 1, vessel 10 and the space between members 1 and 2. We prefer that the rate of recirculation of reaction mixture be at least 10 times, preferably 15 to 100 times, the rate of feed of reagent to inlet 6, both rates being expressed by weight. It is also preferred that the flow rate of the reaction mixture in annular space 3 be in the range 0.1 to 2 meters per second and that the linear rate in the inner tube 1 be in the range 1.5–5 meters per second. By virtue of the comparatively large volume of vessel 10, gas and steam can readily disengage from the reaction mixture and be discharged via outlet 11. We prefer that the gas and/or steam in the reaction mixture is liberated from the reaction mixture at the rate of from 0.015 to 0.2 meters/second. The reaction will usually be carried out under pressure, e.g. 0.1 to 5 kgs/cm$^2$ gauge and at elevated temperature, e.g. 120° to 200° C., notably at the boiling point of the reaction mixture.

The product removed from the product outlet 12 is a hot slurry or solution which is usually at its boiling point. This may be passed to further reaction vessels for further processing; e.g. to a granulation device for granulation optionally in the presence of particles of other fertilizer materials, or to a prilling tower. However, where the product is formed under pressure, it is preferred to pass it to a zone at lower pressure, e.g. to a void vessel or tower 20 operated at ambient pressure and temperature, into which it is sprayed via spray nozzle 21. As a result, the product loses water and a solid particulate product can be obtained. In this case it is preferred that the product in the reactor contain from 5 to 25% by weight of water, have a temperature of 140° to 180° C. and be produced at a pressure of 1 to 3.5 kg/cm$^2$ gauge.

The above form of reactor may be modified in a number of ways. Thus, the reactor need not be of circular cross-section but could be of other shape, e.g. square, triangular or polygonal; vessel 10 may merely take the form of an elongation of outer tube 2 where this is of sufficient diameter to achieve the desired reduction in gas escape velocity; mist separators may be provided in vessel 10; and some of the steam in the reaction mixture may be vented with the product through outlet 12 to assist in spraying the product.

The reaction vessel of the invention finds especial use in the carrying out of exothermic reactions, and a typical example of such a reaction is the neutralisation of a mineral acid, e.g. phosphoric, nitric and/or sulphuric acid, with a liquid or gaseous base, e.g. sodium or potassium hydroxide and/or carbonate or ammonia; notably the ammoniation of an impure acid, e.g. wet process phosphoric acid, using gaseous ammonia.

To aid understanding of the process of the invention, the reaction of ammonia with crude wet process phosphoric acid will now be described in greater detail by way of illustration only.

Ammonia, preferably anhydrous gas or liquid, is fed to inlet 7 which is directed substantiallly co-axially up member 1 with its outlet located within member 1. Phosphoric acid is fed to the tangential inlets 6 which are preferably located in the upper quarter of the length of annular space 3. The rate of feed of acid and ammonia is dictated in part by the NH$_3$:H$_3$PO$_4$ of the final product desired, which is typically in the range 0.85:1 to 1.6:1, the size of the reaction vessel and its desired production rate, and the rate of flow of material through the annular space 3 and member 1. Desirably, the material flows through annular space 3 at a linear flow rate of less than 2 meters per second, e.g from 0.1 to 0.5 meters per second, through member 1 at from 1.5 to 5 meters per second and the reaction vessel is sized so that the weight flow ratio of material circulating in the reaction vessel is at least 10 and preferably from 25 to 100 times the weight feed rate of phosphoric acid fed to inlet 6. Desirably, vessel 10 is of such a diameter that the gas escape velocity is reduced to less than 1, notably less than 0.2, meters per second at the exposed surface of the reaction mixture. Where it is intended that the product should be solidified by flash drying, e.g. by spraying it into a void tower, it is preferred to carry out the above process at a temperature of 140° to 170° C. e.g 140° to 165° C., and at a pressure of from 1.5 to 3.5 kgs/cm$^2$ and to maintain the water content of the reaction mixture in the range 7 to 25% by weight by the use of phosphoric acid feed material containing from 38 to 60% by weight of P$_2$O$_5$.

The above operating conditions relate to the steady state during continuous operation of the process. It will also be appreciated that the above conditions are inter-related and that the optimum conditions for any given case may be achieved by simple trial and error tests carried out within the guide lines laid down above. It is most surprising that only small ammonia losses from the system of the invention can be achieved in view of the highly turbulent conditions which prevail in the steam disengagement vessel 10 and that where ammonia losses do occur that these may be aggravated by decreasing the rate of circulation of reaction mixture in the vessel.

The process of the invention will now be illustrated by way of example in the following Examples in which all parts and percentages are by weight unless stated otherwise.

EXAMPLE 1

Ammonia gas was reacted with phosphoric acid in a reactor as shown in the drawing in which A was 2.2 cms, B was 5.4 cms, C was 175.3 cms and D was 182.9 cms. Phosphoric acid (50% P$_2$O$_5$) was fed at 330 parts/hour to inlet 6, and ammonia gas was fed to inlet 7 at 43 parts per hour. The reactor was pressurised to 2.1 kg/cm$^2$ gauge and held at a temperature of 163° C. The reaction mixture recycling in the reactor was approximately equal to the weight of product removed at outlet 12 and steam vented (at a rate of 3.3 kgs/hour) from outlet 11. The product was fed to a water cooled stainless steel belt to form an ammonium phosphate layer containing 3.3% moisture.

The process was operated for 4 hours continuous operation—with no significant scaling in the reactor.

EXAMPLE 2

Wet process phosphoric acid containing 40% P$_2$O$_5$ was ammoniated in a reaction vessel as shown in the drawing having a design throughput of 7,000 kg/hour of dry ammonium phosphate with the product from the reaction vessel being sprayed from outlet 12 into a rotating tube granulation device in which the product was granulated with recycled fine material. The internal diameter of the inner and outer tubes were in the ratio 1:1.28 and the disengagement vessel had a diameter which was approximately 3.6 times the diameter of the outer tube. The phosphoric acid was fed to the tangential inlets 6 at the rate of 4,620 kg/hour and gaseous ammonia was injected at the rate of 600 kg/hour axially up the inner tube 1 by means of a ring shaped mainfold carrying a number of nozzles located within tube 1. The reaction vessel was operated at a pressure of 2.3 kg/cm$^2$ and a temperature of 154° C. with 770 kg/hour of steam being vented from outlet 11. The reaction mixture was circulated at a linear velocity of 0.3 meters per second in the outer tube and at 1.9 meters per second through the inner tube and was circulating at the rate of 28 parts by weight per unit time for each part by weight per unit time of acid fed to inlet 6. Steam disengaged from the turbulent surface of the reaction mixture in vessel 10 at an overall mean linear velocity of 0.10 meters per second and the loss of product through carry over in the vented steam was only 0.0003%.

Under these conditions a product was produced which had a pH value of 5.5, contained 22% water and was at its boiling point. This product was then sprayed at the rate of 3,500 kg/hour into a rotating drum granulator where further water escaped from the product and a solid product was obtained.

The ammonia utilization in the above system was 98.5% and the system was operated for prolonged runs over a period of four days without any scaling problems.

EXAMPLE 3

Wet process phosphoric (50% P$_2$O$_5$) acid was ammoniated with gaseous ammonia in a reaction vessel as shown in FIG. 1 in which the diameters of the inner and outer tubes were in the ratio 1:2 and the disengagement vessel had a diameter 3 times that of the outer tube. The reaction mixture circulated at 0.15 meters per second through the annular space 3 and at 2.5 meters per second up the inner tube and was circulating at the rate of 40 parts per unit time per part per unit time of phosphoric acid fed to inlet 6. Steam was disengaged at a velocity of 0.08 meters per second from the reaction mixture in vessel 10. Water was fed to the reactor at the rate of 12 kg/hour to maintain the reaction temperature.

Phosphoric acid and gaseous ammonia were fed in weight ratios of 8.42:1 to provide a reaction mixture at 158° C. having a pH of 3.5 and containing 17% of water. This mixture was sprayed into a void tower to provide a solid ammonium phosphate product. The sytem was operated for 18 hours continuously with no detectable scale formation. The ammonia utilisation was 99.8% even though in this Example the recirculation rate was higher and the contact time between the ammonia and the reaction mixture was shorter than in Example 2.

I claim:

1. A process for reacting ammonia and wet process phosphoric acid to produce ammonium phosphates, which process comprises feeding the reagents to a vessel comprising two tubular members in fluid flow communication with one another and a gas disengagement vessel, at least one of said tubular members being generally upright, the ammonia being fed to the basal portion of the upright member, the phosphoric acid being fed to the other tubular member; allowing the resultant reaction mixture to circulate spontaneously up the upright member, through the gas disengagement vessel and through the other member to the upright member; and recovering the ammonium phosphate reaction products from the reaction system by discharging the reaction mixture into a zone at ambient pressure and temperature whereby the reaction mixture loses water and is converted into a solid product.

2. A process as claimed in claim 1, wherein the ammonia is gaseous.

3. A process for reacting ammonia with wet process phosphoric acid to product ammonium phosphates, which process comprises feeding the reagents to a vessel comprising an elongated tubular member having one end closed and having mounted upon the other, open end, a vessel of larger cross-section than the elongated tubular member, there being mounted within said elongated tubular member an inner open ended tubular member, the inner member not extending to the closed end of the outer elongated tubular member, whereby there is provided an annular space between the inner and outer tubular members; the phosphoric acid being injected into the outer tubular members or into the inner member, the ammonia being injected adjacent to the closed end of the outer member either into the inner member or into the annular space, respectively, and a vapor outlet and a product outlet, and allowing the reaction mixture to circulate through the inner tubular member, the larger cross-section vessel and the annular space between the tubular members; and recovering the ammonium phosphates by discharging the ammonium phosphates into a zone at ambient pressure and temperature whereby the reaction mixture loses water and is converted into a solid product.

4. A process as claimed in claim 1, wherein the reaction mixture flows at a linear flow rate of at least 1.5 meters per second through the upright tubular member.

5. A process as claimed in claim 1, wherein the reaction mixture flows at a linear velocity of from 0.1 to 2 meters per second through the other tubular member.

6. A process as claimed in claim 1, wherein gaseous material escapes from the reaction mixture in the gas disengagement at a linear flow rate of less than 5 meters per second.

7. A process as claimed in claim 1, wherein the ratio of the rate of recirculation of the reaction mixture to the feed of the reagents, both on a weight per unit time basis, is at least 10:1.

8. A process for the production of ammonium phosphates which comprises feeding ammonia to the bottom third of the length of a upright tubular member of a reaction vessel, which comprises two elongated tubular members in fluid flow communication with one another and with a void vessel, at least one of the tubular members being generally upright, whereby there is formed a circulation loop comprising the upright member, the void vessel and the other members; feeding phosphoric acid to the other tubular member whereby there is formed a reaction mixture having an NH$_3$:H$_3$PO$_4$ molar ratio of from 0.85:1 to 1.6:1 at a pressure of from 1.5 to 3.5 kg/cm$^2$ and at a temperture of 140° to 170° C.; and allowing the reaction mixure to circulate spontaneously at a linear flow rate of less than 2 meters per second through the other tubular member and at a linear flow rate of from 1.5 to 5 meters per second up the upright tubular member and at a rate of 25 to 100 times the rate of feed of phosphoric acid, both rates on a weight per unit time basis; and steam disengaging from the reaction mixture in a disengagement zone at a linear flow rate of less than 1 meter per second and recovering the ammonium phosphates by discharging the reaction mixture into a zone at ambient pressure and temperature whereby the reaction mixture loses water and is converted into a solid product.

9. A process as claimed in claim 1, wherein the tubular members are provided by the two arms of a U tube.

10. A process as claimed in claim 1, wherein the two tubular members are provided by longitudinally partitioning an elongated hollow member.

11. A process as claimed in claim 1, wherein the gas disengagement vessel is provided by a vessel of larger diameter than either of the tubular members.

12. A process as claimed in claim 11, wherein the gas disengagement vessel has a cross-sectional area 10 to 100 times the cross-sectional area of the upright tubular member.